US009055347B2

(12) United States Patent (10) Patent No.: US 9,055,347 B2
Walter (45) Date of Patent: Jun. 9, 2015

(54) APPARATUS AND METHOD FOR PROVIDING ELECTRONIC PROGRAM GUIDES

(75) Inventor: Edward Walter, Boerne, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 815 days.

(21) Appl. No.: 12/829,986

(22) Filed: Jul. 2, 2010

(65) Prior Publication Data

US 2012/0005709 A1 Jan. 5, 2012

(51) Int. Cl.
*H04N 21/84* (2011.01)
*H04N 21/658* (2011.01)
*H04N 21/2665* (2011.01)
*H04N 21/458* (2011.01)
*H04N 21/482* (2011.01)

(52) U.S. Cl.
CPC ....... *H04N 21/6581* (2013.01); *H04N 21/2665* (2013.01); *H04N 21/4586* (2013.01); *H04N 21/482* (2013.01); *H04N 21/84* (2013.01)

(58) Field of Classification Search
USPC .............................. 725/48–50, 59
See application file for complete search history.

(56) References Cited

U.S. PATENT DOCUMENTS

| | | | | |
|---|---|---|---|---|
| 6,862,741 | B1* | 3/2005 | Grooters | 725/39 |
| 7,533,400 | B1* | 5/2009 | Hailey et al. | 725/49 |
| 7,546,623 | B2* | 6/2009 | Ramraz et al. | 725/48 |
| 2002/0129367 | A1* | 9/2002 | Devara | 725/46 |
| 2003/0051240 | A1* | 3/2003 | Schaffer et al. | 725/34 |
| 2003/0051246 | A1* | 3/2003 | Wilder et al. | 725/49 |
| 2005/0251821 | A1* | 11/2005 | Pina | 725/39 |
| 2007/0061840 | A1* | 3/2007 | Walter et al. | 725/39 |
| 2007/0061842 | A1* | 3/2007 | Walter et al. | 725/48 |
| 2007/0250896 | A1* | 10/2007 | Parker et al. | 725/135 |
| 2008/0134250 | A1* | 6/2008 | Liu et al. | 725/46 |
| 2009/0077584 | A1* | 3/2009 | Glasgow et al. | 725/39 |
| 2009/0094646 | A1* | 4/2009 | Walter et al. | 725/48 |
| 2009/0210903 | A1 | 8/2009 | White | |
| 2009/0260038 | A1* | 10/2009 | Acton et al. | 725/49 |
| 2010/0071000 | A1* | 3/2010 | Amento et al. | 725/39 |
| 2011/0103374 | A1* | 5/2011 | Lajoie et al. | 370/352 |

* cited by examiner

*Primary Examiner* — Jason Salce
(74) *Attorney, Agent, or Firm* — Guntin & Gust, PLC; Douglas Schnabel

(57) ABSTRACT

A system that incorporates teachings of the present disclosure may include, for example, a server having a controller to provide a media processor with a description of available channels, receive from the media processor a request for EPG data and a selection of channels from the available channels where the selection of channels is based on a user's input at the media processor in response to a presentation of the description of the available channels at a display device operably connected to the media processor, and provide to the media processor the requested EPG data representing programming for the selection of channels without programming for remaining channels from the available channels that were not selected, where the media processor presents an EPG based on the provided EPG data, and where a portion of the EPG data is obtained by the controller from a first service provider network that is different from a second service provider network in which the server operates. Other embodiments are disclosed.

17 Claims, 7 Drawing Sheets ured EPG data representing programming for the selection of channels without programming for remaining channels from the available channels that were not selected and present at the display device an EPG based on the received EPG data.

APPARATUS AND METHOD FOR PROVIDING ELECTRONIC PROGRAM GUIDES

FIELD OF THE DISCLOSURE

The present disclosure relates generally to media content communication and more specifically to an apparatus and method for providing electronic program guides.

BACKGROUND

Media consumption has become a multibillion dollar industry that continues to grow rapidly. Programming options continue to increase with numerous channels being available for viewing from various service providers.

Electronic program guides are available from many service providers. These guides provide a GUI that automatically, or upon user actuation, scroll through the channels to indicate a schedule of available programming on each of the channels.

DETAILED DESCRIPTION

One embodiment of the present disclosure can entail a server including a controller to provide a media processor with a description of available channels and receive from the media processor a request for Electronic Programming Guide (EPG) data and a selection of channels from the available channels. The selection of channels can be based on a user's input at the media processor in response to a presentation of the description of the available channels at a display device operably connected to the media processor. The controller can also provide to the media processor the requested EPG data representing programming for the selection of channels without programming for remaining channels from the available channels that were not selected. The media processor can present an EPG based on the provided EPG data. A portion of the EPG data can be obtained by the controller from a first service provider network that is different from a second service provider network in which the server operates.

One embodiment of the present disclosure can entail a non-transitory computer-readable storage medium operating in a media processor, where the storage medium includes computer instructions to present a description of available channels at a display device operably coupled with the media processor, receive a selection of channels in response to the presentation of the description of the available channels, and transmit to a server a request for EPG data and the selection of channels. The computer instruction can also receive the requested EPG data representing programming for the selection of channels without programming for remaining channels from the available channels that were not selected and present at the display device an EPG based on the received EPG data.

One embodiment of the present disclosure can entail a method including providing a description of available channels to a plurality of media processors, receiving requests for EPG data and selections of channels from the available channels, and identifying matching selections of channels among the selections of channels. The method can also include determining corresponding media processors that transmitted the matching selections; and providing to the corresponding media processors the requested EPG data representing programming for the matching selections of channels without programming for remaining channels from the available channels that were not selected, where each of the corresponding media processors presents an EPG based on the provided EPG data.

Figure 1:
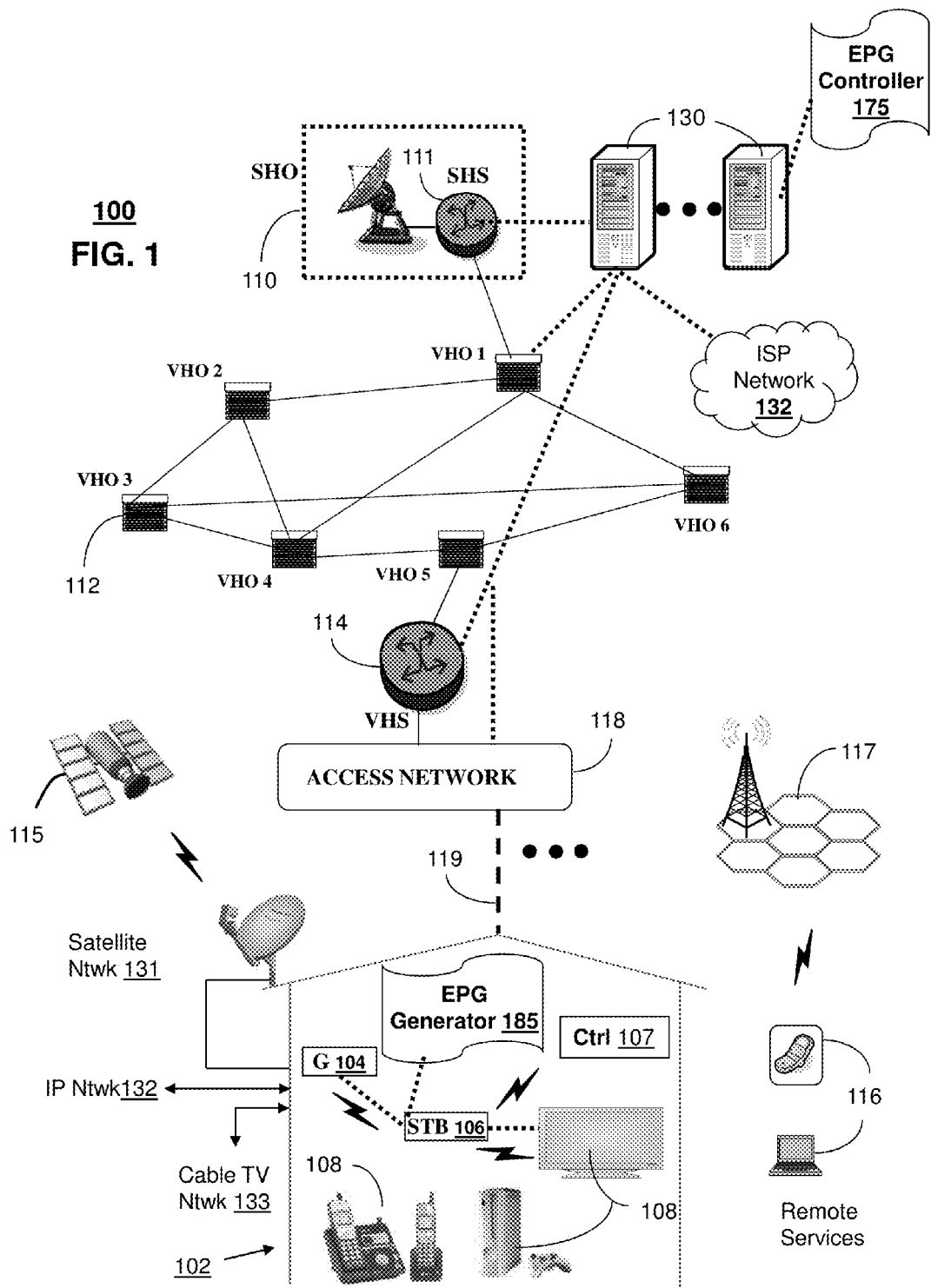
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system, although other media broadcast systems are contemplated by the present disclosures. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provides broadband services over optical links or copper twisted pairs 119 to buildings 102. The gateway 104 can use common communication technology to distribute broadcast signals to media processors 106 such as Set-Top Boxes (STBs) or gaming consoles, which in turn present broadcast channels to media devices 108 such as computers, television sets, managed in some instances by a media controller 107 (such as an infrared or RF remote control, gaming controller, etc.).

The gateway 104, the media processors 106, and media devices 108 can utilize tethered interface technologies (such as coaxial, phone line, or powerline wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an EPG, or other infrastructure services. The present disclosure also contemplates delivery of media content to a plurality of display devices without using set top boxes. For instance, the gateway 104 can receive media content in various formats and convert the media content into a format that is compatible with the display devices, such as the Digital Living Network Alliance (DLNA) standard.

Some of the network elements of the IPTV media system can be coupled to one or more computing devices 130. The computing devices 130, or a portion thereof, can operate as a web server for providing portal services over an Internet Service Provider (ISP) network 132 to wireline media devices 108 or wireless communication devices 116 (e.g., cellular phone, laptop computer, etc.) by way of a wireless access base station 117. The base station 117 can operate according to common wireless access protocols such as WiFi, or cellular communication technologies (such as GSM, CDMA, UMTS, WiMAX, Software Defined Radio or SDR, and so on).

A satellite broadcast television system can be used in place of, or in addition to, the IPTV media system. In this embodiment, signals transmitted by a satellite 115 carrying media content can be intercepted by a common satellite dish receiver 131 coupled to the building 102. Modulated signals intercepted by the satellite dish receiver 131 can be transferred to the media processors 106 for decoding and distributing broadcast channels to the media devices 108. The media processors 106 can be equipped with a broadband port to the IP network 132 to enable services such as VoD and EPG described above.

In yet another embodiment, an analog or digital broadcast distribution system such as cable TV system 133 can be used in place of, or in addition to, the IPTV media system described above. In this embodiment the cable TV system 133 can provide Internet, telephony, and interactive media services.

It is contemplated that the present disclosure can apply to any present or next generation over-the-air and/or landline media content services system. In one embodiment, an IP Multimedia Subsystem (IMS) network architecture can be utilized to facilitate the combined services of circuit-switched and packet-switched systems in delivering the media content to one or more viewers.

The computing devices 130 can include a controller 175 for processing EPG data. In one embodiment, the controller 175 can receive a request from Customer Premises Equipment (CPE), such as the media processor 106 or gateway 104, for EPG data. The request can include designated channels for which the EPG data is sought. The controller can retrieve the EPG data for only those designated channels and transmit the EPG data to the CPE for presentation of a customized EPG. In another embodiment, the controller 175 can retrieve EPG data from other sources, including other service provider networks, such as a satellite television network or a cable television network, and can merge the EPG data. The merged EPG data can be transmitted to the CPE for presentation of a comprehensive, customized EPG. The controller can reduce load on the network by delivering EPG data for selected channels rather than all of the EPG data.

In one embodiment, the controller 175 can determine if there are matching channel selections among a number of CPE's and if so, can deliver the same EPG data to each CPE of the number of CPE's, such as through multicasting. The delivery of the EPG data can include transmitting the EPG to the CPE and can include transmitting data representing the programming and schedules which is then populated into an EPG template by the CPE.

In one embodiment, the media processor 106, such as an STB, can include an EPG generator that receives the EPG data from the controller 175 and generates the EPG from the received data. The EPG generator can also generate a filter file which is a selection of the channels that a user desires to have included in the EPG. The filter file can be stored on a memory of the media processor 106 or in a memory accessible by the media processor.

In one embodiment, the media processor 106 can present a description of available channels from which the user can select to generate the filter file. For example, the description can include titles of some or all of the programming that is broadcast over the particular channels. In another embodiment, the description can include text and/or images representative of a type of subject matter broadcast over the channel. For instance, a home improvement channel can present a description that shows information associated with the types of home improvement programming broadcast over the particular channel.

Figure 2:
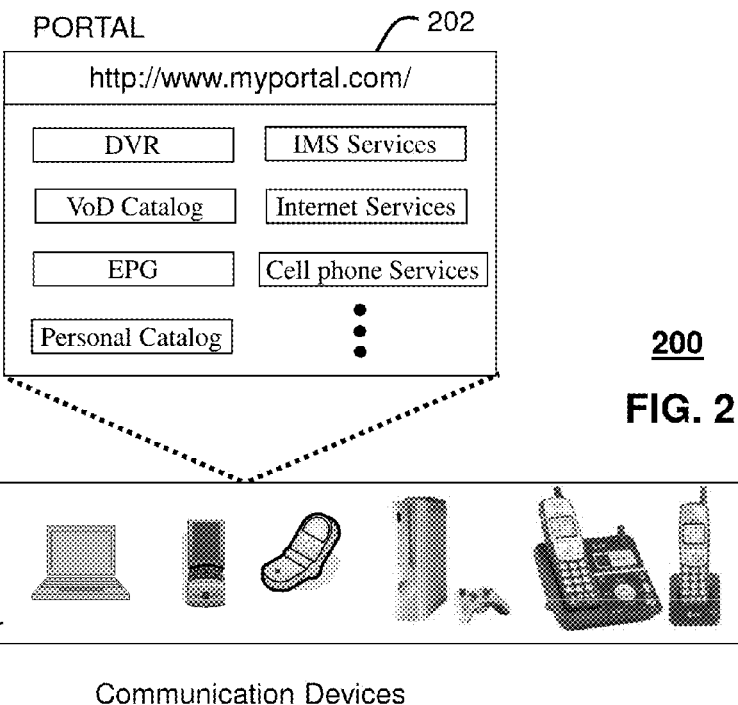
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser using an Internet-capable communication device such as those illustrated FIG. 1. The portal 202 can be configured, for example, to access a media processor 106 and services managed thereby such as a Digital Video Recorder (DVR), a VoD catalog, an EPG, a video gaming profile, a personal catalog (such as personal videos, pictures, audio recordings, etc.) stored in the media processor, to provision IMS services described earlier, to provision Internet services, provisioning cellular phone services, and so on.

Figure 3:
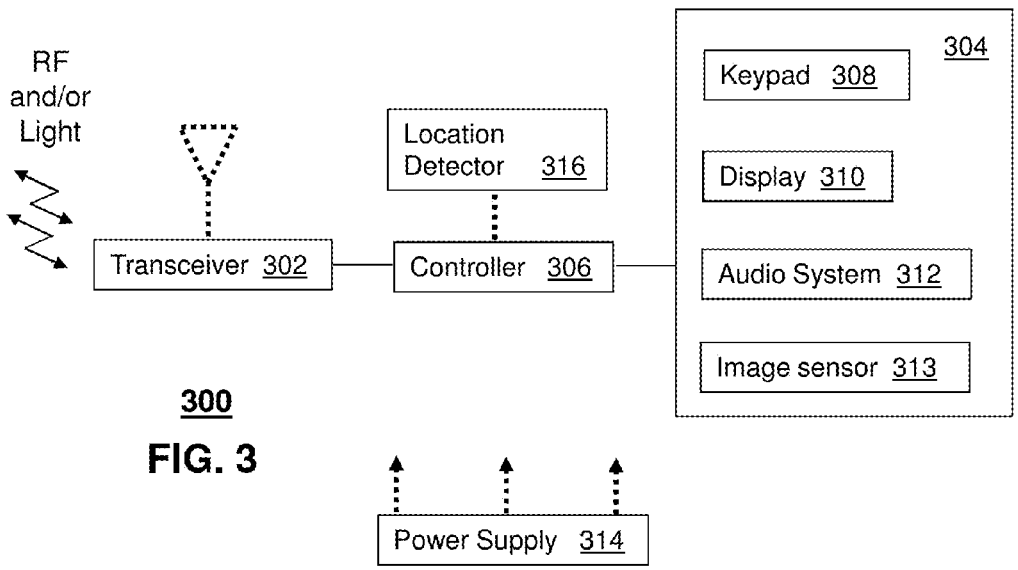
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of the communication devices of FIG. 1 and other communication devices described herein. The communication device 300 can comprise a wireline and/or wireless transceiver 302 (herein transceiver 302), a user interface (UI) 304, a power supply 314, a location detector 316, and a controller 306 for managing operations thereof. The transceiver 302 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display 310.

The UI 304 can also include an audio system 312 that utilizes common audio technology for conveying low volume audio (such as audio heard only in the proximity of a human ear) and high volume audio for hands free operation. The audio system 312 can further include a microphone for receiving audible signals from an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location detector 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such as Flash, ROM, RAM, SRAM, DRAM or other storage technologies.

The communication device 300 can be adapted to perform the functions of the media processor 106, the media devices 108, or the portable communication devices 116 of FIG. 1, as well as IMS CDs and PSTN CDs. It will be appreciated that the communication device 300 can also represent other common devices that can operate in communication system 100 of FIG. 1 such as a gaming console and a media player.

Figure 4:
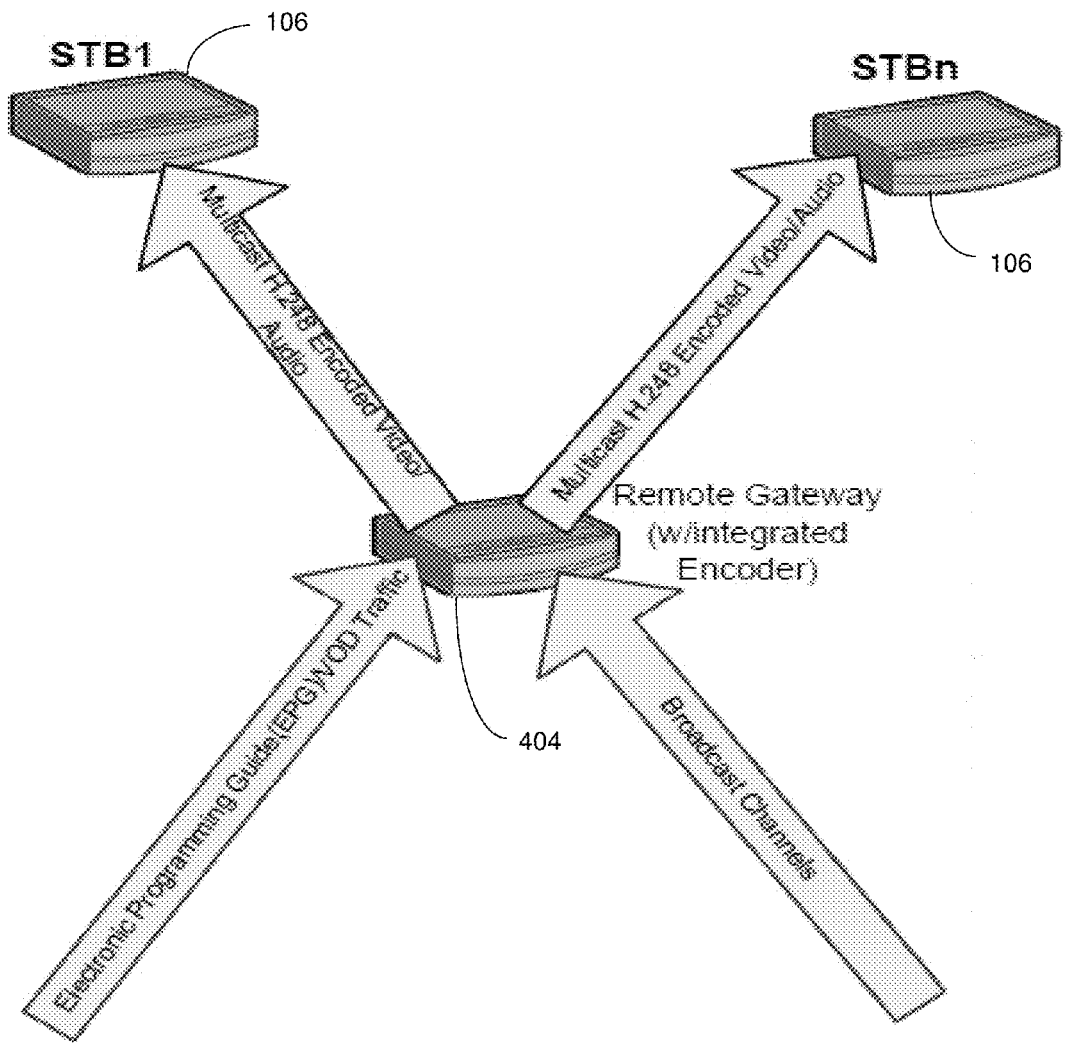
FIGS. 4-6 depict illustrative embodiments of communication systems that provide media services.

FIG. 4 depicts an illustrative embodiment of a second communication system 400 for delivering media content. Communication system 400 can be overlaid or operably coupled with communication system 100 as another representative embodiment of communication system 400. System 400 can include a gateway 404 for receiving media content and other data, including EPG data, and distributing the content and data to one or more media processors 106 (such as STB's). The gateway 404 can receive broadcast channels, VOD traffic, and other content from various sources. In one embodiment, the gateway 404 can receive the EPG data having selected channels that are associated with multiple service provider sources. In one embodiment, the gateway 404 can be CPE residing at the user's premises.

Figure 5:
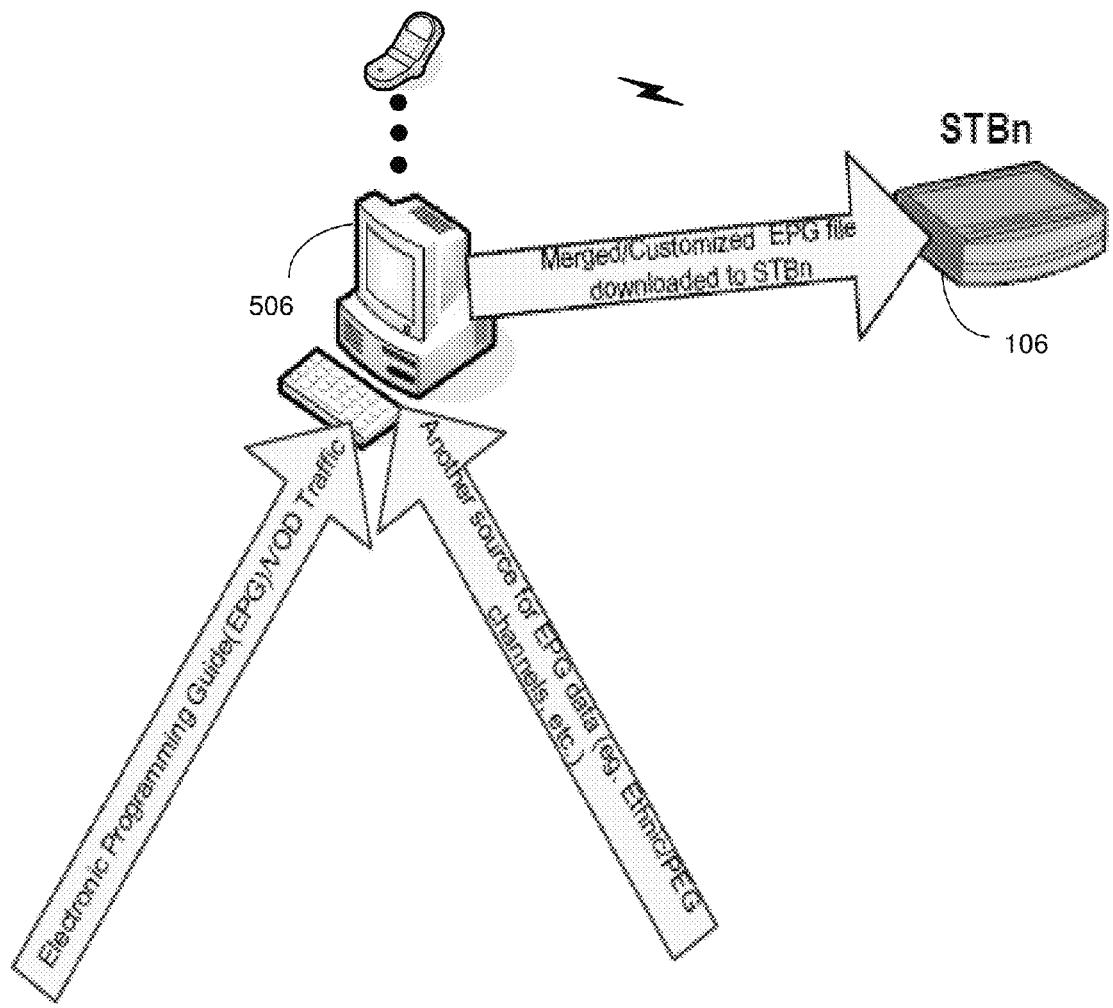

FIG. 5 depicts an illustrative embodiment of a third communication system 500 for delivering media content. Communication system 500 can be overlaid or operably coupled with communication systems 100 and 400 as another representative embodiment of communication system 500. System 500 can include a communication device 506, such as a desktop or laptop computer, for receiving EPG data. The communication device 506 can receive EPG data from multiple sources, including multiple service provider networks that are associated with the programming available to a particular user. The received EPG data can be based on a user selection of channels among available channels that the user desires to have included in the EPG. The communication device 506 can merge the EPG data and provide it to the STB's 106 or to other devices including directly to the display devices or to a gateway located in the home. The merged EPG data allows the STB or other device to present an EPG that includes the selected channels from different service provider networks.

In one embodiment, the communication device 506 can be a mobile device, such as a cellular phone or PDA, that is not associated with the particular residence or devices within a residence in which the EPG is to be presented. The mobile device 506 can present an EPG on a display device within the residence based on selections made by the user of the mobile device rather than selections made by the user of the CPE in the particular residence. For example, a first user can select channels and generate a filter file for an EPG at the first user's residence, or elsewhere, through use of the media processor 106, gateway or other device as described above. The first user can utilize that filter file or data associated with the filter file for generating an EPG at a second user's residence using the second user's media processor 106, gateway or other device. For instance, the first user can enter the residence of the second user and utilize the first user's mobile phone 506 to retrieve the first user's filter file, such as through communication between the mobile phone and the first user's media processor 106. The second user's media processor 106, gateway or other device can utilize the first user's filter file to retrieve the desired EPG data and present the EPG on a display device.

Figure 6:
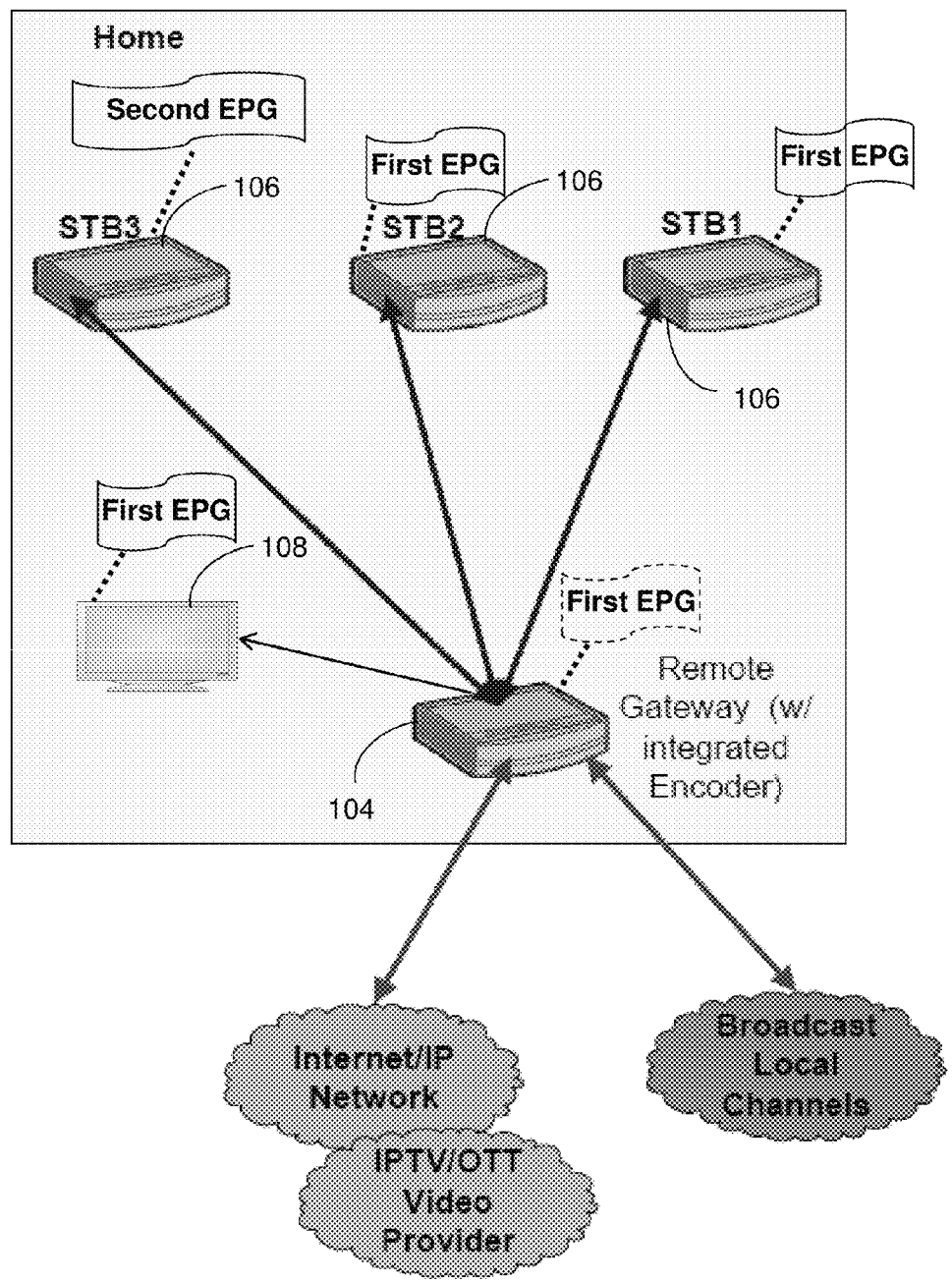

FIG. 6 depicts an illustrative embodiment of a fourth communication system 600 for delivering media content. Communication system 600 can be overlaid or operably coupled with communication systems 100, 400 and 500 as another representative embodiment of communication system 600. System 600 can include a gateway 104 for receiving media content and other data, including EPG data, and distributing the content and data to one or more media processors 106 (such as STB's). The gateway 104 can receive broadcast channels, IPTV programming, VOD traffic, and other content from various sources. The gateway can also provide a user with Internet access. In one embodiment, the gateway 104 can receive the EPG data having selected channels that are associated with multiple service provider sources.

In one embodiment, the gateway 104 can distribute the EPG data (which was filtered by the computing devices 130) to each of the STB's 106. The STB's 106 can present EPG's based on the EPG data. For instance, one or more STB's 106 can present a first EPG that includes all of the EPG data and thus includes all of the channels that were selected and stored in the filter file. One or more second STB's 106 can present a second EPG that includes less than all of the EPG data and thus does not show all of the channels that were selected and stored in the filter file. The additional filtering by the one or more second STB's 106 can be based upon a number of factors and techniques. For example, parental controls can be applied to a particular STB 106 so that certain channels are not depicted in the EPG shown on the display device coupled with the particular STB.

In another embodiment, user profiles can be applied by the STB 106 when presenting the EPG. For example, when a user profile associated with a child in the residence is detected then the STB 106 can modify the EPG to contain only channels appropriate for the child. Other factors and techniques can also be used to adjust the EPG, including changing the order of the channels based on user preferences and/or based on monitored behavior. For example, the EPG can present the channels in the order of most viewed over a particular time period, such as over the past month.

In one embodiment, the gateway 104 can receive the EPG data and generate an EPG for presentation on a display device 108 without using a STB 106. For instance, the gateway 104 can employ DLNA protocol or another universal delivery protocol for delivering the EPG, as well as media content, to one or more display devices (e.g., televisions) throughout the home without using a STB.

Figure 7:
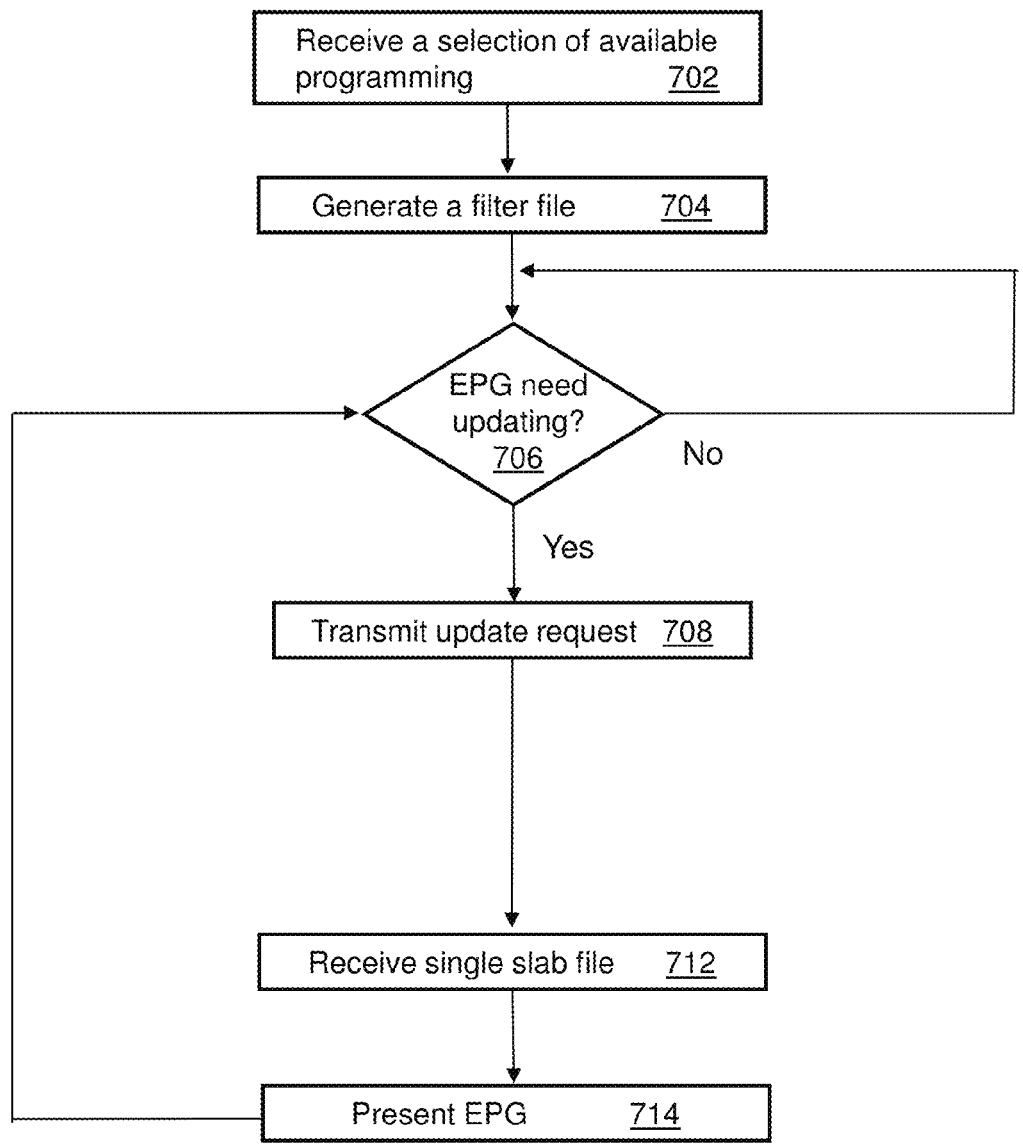
FIG. 7 depicts an illustrative embodiment of a method operating in portions of the devices and systems of FIGS. 1-6.

FIG. 7 depicts an illustrative embodiment of a method 700 operating in portions of the devices and systems described herein and/or illustrated in FIGS. 1-6. Method 700 can begin with step 702 in which a selection of available programming is received by a media processor 106 and presented to a user on a display device 108 operably coupled with the media processor. The exemplary embodiment describes the selection being received and processed by the media processor 106, however the present disclosure contemplates various devices, including the gateway 104, receiving and processing the selection of available channels. The selection can be received from various sources and/or combinations of sources, including from the controller 175 in an IPTV network. The selection can include a description of available channels from which to choose to be included in the EPG.

In step 704, a filter file is generated and stored by the media processor 106. The filter file can be generated in response to user inputs at the media processor 106, such as through use of a remote controller 107 interacting with a GUI on the display device 108. The GUI can include other information that facilitates the user choosing from the selection of available channels, such as a viewing history of channels based on monitored behavior associated with the media processor. The monitoring of the viewing behavior can be performed by the media processor 106. The filter file can be stored in a memory of the media processor 106, such as a hard-drive of an STB, or in a memory of another device that is accessible by the media processor.

A determination as to whether the EPG needs updating can be made in step 706. If updating is needed, then in step 708 a request for EPG data can be transmitted from the media processor to the controller 175. The request can include the stored filter file. In step 712, the media processor can receive a single slab file containing the requested EPG data. The EPG data can be generated by the service provider's controller 175 based on the filter file, where only EPG data associated with the user's selection of channels is included in the single slab file. In one embodiment, the controller 175 can merge its own EPG data with EPG data from another service provider network which is also providing media content to the user.

In one embodiment, the controller 175 can receive multiple selections of channels (i.e., multiple filter files) from different users. The controller can match selections and multicast or otherwise transmit the same EPG data to each of the user's associated with the matched selections. In step 714, an EPG can be generated and presented, which includes only those channels that are desired by the user.

Upon reviewing the aforementioned embodiments, it would be evident to an artisan with ordinary skill in the art that said embodiments can be modified, reduced, or enhanced without departing from the scope and spirit of the claims described below. The embodiments described above can be adapted to operate with any device capable of performing in whole or in part the steps described for method 800. For example, a cellular phone can be adapted to receive the customized EPG for presentation on a display of the cellular phone.

In one embodiment, multiple filter files can be used to retrieve multiple groups of EPG data. The groups of EPG data can then be merged by the media processor for generating a single EPG. For instance, the multiple filter files can be associated with different users, including different users having different accounts.

In one embodiment, a gateway can receive broadcast video/audio from an integrated/external antenna. An integrated encoder of the gateway can convert the signal into H.248 and multicast this across a customer's IP Network. An STB can convert and process the signal for delivery to a Television. An EPG can be generated by mapping the received channels to the appropriate EPG Channel within the EPG file that would be delivered to the STB. The OTT/IPTV Service Provider can also deliver multi-bit rate (e.g., fragmented MP4) and/or progressive download video/audio to the STB across an Internet/IP connection. In one embodiment, the exemplary process allows for a smaller EPG file to be sent down to a customer versus the entire EPG Guide. In addition, the EPG file can be customized versus a single static file. In another embodiment, EPG data can be sent to an application residing on a customer's personal computer or other communication device. This would allow for customized presentation of the information, mapping multiple sources of content guide data, and user created content description.

In one embodiment, method 700 allows for customization of the EPG file to include other sources of data (other than just the primary service provider). The exemplary embodiment also allow for less expensive STBs versus each STB having an integrated tuner for off-the-air broadcasts. Instead, one device can collect content, encode, and multicast out to all the STBs in home.

Other suitable modifications can be applied to the present disclosure without departing from the scope of the claims below. Accordingly, the reader is directed to the claims section for a fuller understanding of the breadth and scope of the present disclosure.

Figure 8:
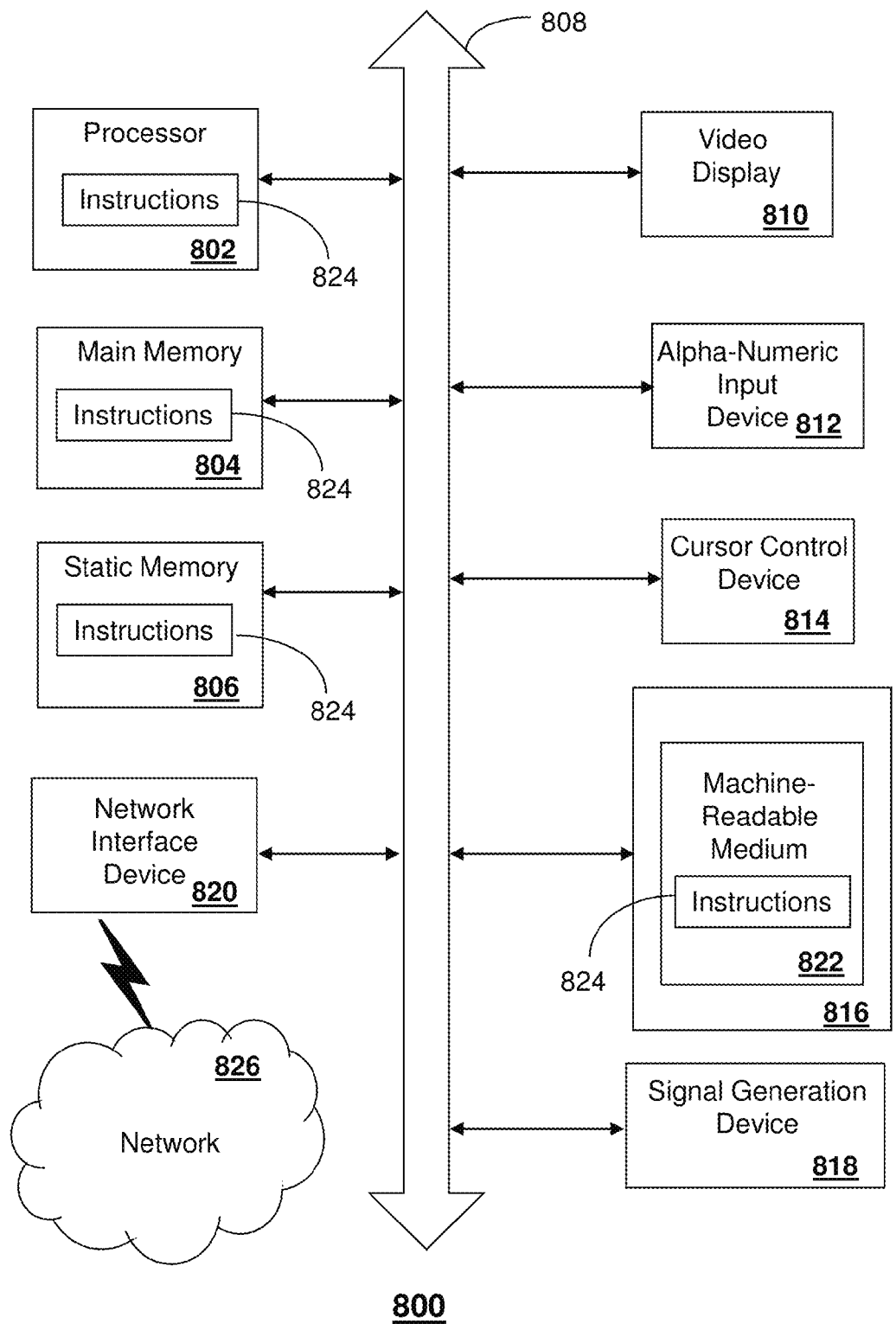
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
a memory storing computer instructions; and
a controller coupled with the memory, wherein the controller, responsive to executing the computer instructions, performs operations comprising:
providing a media processor with a description of available channels;
receiving from the media processor a request for electronic programming guide data and a selection of channels from the available channels, the selection of channels being based on a user's input at the media processor in response to a presentation of the description of the available channels at a display device operably connected to the media processor;
matching the selection of channels with other selections of channels from other media processors; and
providing to the media processor and to the other media processors via a multicast and via a residential gateway, the electronic programming guide data representing programming for the selection of channels without programming for remaining channels from the available channels that were not selected, wherein a portion of the electronic programming guide data is obtained by the controller from a first service provider network that is different from a second service provider network in which the server operates, and wherein the residential gateway merges the electronic programming guide data to generate merged electronic programming guide data, wherein the media processor generates and presents an electronic programming guide based on the merged electronic programming guide data utilizing an electronic programming guide template stored at the media processor, wherein the description of the available channels comprises titles of a portion of programming broadcast over one of the available channels.

2. The server of claim 1, wherein the description of the available channels includes images representative of subject matter of each of the channels.

3. The server of claim 1, wherein the first service provider network is one of a cable or satellite network, and wherein the second service provider network is an Internet protocol television network.

4. The server of claim 1, wherein the electronic programming guide data is provided to another media processor for filtering based on a user profile to generate filtered electronic programming guide data, and wherein the other media processor generates a filtered electronic programming guide that is presented on another display device that is not associated with the user.

5. The server of claim 1, wherein the media processor is incorporated with the display device in a television.

6. The server of claim 1, wherein the description of the available channels comprises titles of a portion of the programming broadcast over a first of the available channels.

7. A computer-readable storage device comprising computer instructions, which when executed by a processor, cause the processor to perform operations comprising:
    transmitting a description of available channels to a display device for presentation at the display device that is operably coupled with the processor;
    receiving a selection of channels in response to the presentation of the description of the available channels, wherein the selection of channels is based on user input;
    transmitting to a server a request for electronic programming guide data and the selection of channels;
    receiving the electronic programming guide data from multiple sources of different service provider networks, wherein the electronic programming guide data represents programming for the selection of channels without programming for remaining channels from the available channels that were not selected, wherein a portion of the electronic programming guide data is via a multicast performed by the server based on matching the selection of channels with other selections of channels from other media processors that are remote from the processor, wherein the multicast is to the processor and the other media processors;
    merging the electronic programming guide data to generate merged electronic programming guide data;
    transmitting the merged electronic programming guide data to the other media processors via a residential gateway for generating an electronic programming guide at each of the other media processors using an electronic programming guide template and a user profile stored at each of the other media processors; and
    transmitting a viewing history with the description of available channels to the display device for presentation at the display device.

8. The storage device of claim 7, wherein the operations further comprise:
    storing the selection of channels in a stored selection of channels;
    determining when the electronic programming guide requires updating; and
    transmitting to the server a subsequent request for electronic programming guide data and the stored selection of channels when the electronic programming guide requires updating.

9. The storage device of claim 7, wherein the operations further comprise removing a first of the channels from the selection of channels in the electronic programming guide.

10. The storage device of claim 9, wherein the removing of the first of the channels is based on parental controls associated with a processor of the other media processors.

11. The storage device of claim 9, wherein the removing of the first of the channels is based on the user profile associated with the processor of the other media processors.

12. The storage device of claim 7, wherein the operations further comprise monitoring consumption behavior at the other media processors, wherein the electronic programming guides at each media processor of the other media processors is generated based in part on the monitoring of the consumption behavior.

13. The storage device of claim 12, wherein a first service provider network of the different service provider networks is an Internet protocol television network, and wherein a second service provider network of the different service provider networks is one of a cable or satellite television network.

14. The storage device of claim 7, wherein the description of available channels includes images representative of subject matter associated with the available channels.

15. A method comprising:
    transmitting, by a system including a processor, a description of available channels to a plurality of media processors;
    receiving, by the system, requests for electronic programming guide data and selections of channels from the available channels, wherein the selections of channels are based on user input;
    identifying, by the system, matching selections of channels among the selections of channels;
    determining, by the system, corresponding media processors that transmitted the matching selections;
    transmitting, by the system, to the corresponding media processors via a residential gateway, wherein the electronic programming guide data represents programming for the matching selections of channels without programming for remaining channels from the available channels that were not selected, wherein the residential gateway merges the electronic programming guide data with electronic programming guide data received from a different service provider network to generate merged electronic programming guide data, wherein each of the corresponding media processors generates and presents an electronic programming guide based on the merged electronic programming guide data utilizing an electronic programming guide template stored at the corresponding media processors; and
    periodically receiving, by the system, subsequent requests for the electronic programming guide data and the selections of channels from the available channels.

16. The method of claim 15, comprising multicasting the electronic programming guide data to the corresponding media processors, wherein the electronic programming guides are generated based on user profiles stored at each of the corresponding media processors.

17. The method of claim 15, comprising retrieving a portion of the electronic programming guide data from a first service provider network that is different from a second service provider network associated with the plurality of media processors.

\* \* \* \* \*